United States Patent
Tsu et al.

(12)

(10) Patent No.: US 8,432,019 B2
(45) Date of Patent: *Apr. 30, 2013

(54) TECHNIQUES FOR CAPACITIVELY COUPLING SIGNALS WITH AN INTEGRATED CIRCUIT

(75) Inventors: William P. Tsu, San Jose, CA (US); William B. Simms, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 12/650,958

(22) Filed: Dec. 31, 2009

(65) Prior Publication Data

US 2010/0295155 A1   Nov. 25, 2010

Related U.S. Application Data

(63) Continuation of application No. 11/264,882, filed on Nov. 1, 2005, now Pat. No. 7,694,062.

(51) Int. Cl.
   *H01L 21/425* (2006.01)
(52) U.S. Cl.
   USPC ......................................................... 257/532

(58) Field of Classification Search ............... 257/532, 257/533, 534, 535
See application file for complete search history.

(56) References Cited

U.S. PATENT DOCUMENTS

| | | | |
|---|---|---|---|
| 2005/0104623 A1 | 5/2005 | Guo et al. | |
| 2006/0038692 A1* | 2/2006 | Schnetker | 340/635 |
| 2006/0067440 A1 | 3/2006 | Hsu et al. | |
| 2006/0149977 A1* | 7/2006 | Cooper | 713/300 |

OTHER PUBLICATIONS

Intel, "Board Design Guidelines for PCI Express Interconnect", 2003, PCI-SIG Developers Conference, pp. 1-4.

* cited by examiner

*Primary Examiner* — Charles Garber
*Assistant Examiner* — Reema Patel (57) ABSTRACT

System and apparatus for capacitively coupling signals with an integrated circuit (IC) are described. Capacitive elements disposed with a transmitting IC effectively function as AC coupling capacitors for a PCIe, DisplayPort™ or other interconnect linking the transmitting IC with a receiver disposed remote there from. Integrating the coupling capacitors allows for a smaller and more economical design for the circuits that utilize the interconnect.

5 Claims, 12 Drawing Sheets

FIGURE 3
(Conventional)

TECHNIQUES FOR CAPACITIVELY COUPLING SIGNALS WITH AN INTEGRATED CIRCUIT

CROSS-REFERENCE TO RELATED APPLICATIONS

This is a continuation of U.S. patent application Ser. No. 11/264,882 filed Nov. 1, 2005, which is incorporated herein by reference.

BACKGROUND OF THE INVENTION

Integrated circuits (ICs) are common devices in modern electronics. The ICs in a typical personal computer (PC) include a central processing unit (CPU) mounted on a motherboard. The motherboard has connections to couple signals to and from the CPU. CPUs can exchange signals with other ICs such as memory, other processors, application specific ICs (ASICs) and dedicated function IC sets, e.g., chipsets. Some ICs may be mounted on the motherboard with others mounted on another printed circuit board (PCB) coupled therewith.

For performing some computer functions and/or modern applications, the CPU may interact with other processors, which may be mounted on another PCB. Graphics exemplify such a function. Processing related to powerful modern graphics applications can utilize computational resources extensively. It is thus common for modern computers to include a video processor and dedicated memory, etc., typically mounted on a video card ported to the motherboard to readily exchange video, timing, control and other signals with the CPU and related chipsets.

As with other functions exemplified herein with reference to graphics, data and other signals exchanged between processors are transmitted by one IC, the transmitter (Tx) and received by another IC, the receiver (Rx). Certain electrical parameters are significant to such signal exchange. Effective data exchange and other communication between Tx and Rx are thus affected by these electrical parameters.

Significant electrical parameters can include for instance voltage levels, grounding, noise, bias, and connection and interconnection configurations, among others. Due in part to their similar functionality, widespread use and diversified sources of manufacture, many modern computers and other electronics are designed such that they share some electrical parameters in common. Industry standards have been developed to promote such commonality. This can have benefits related to interchangeability.

Continuing with the example of graphics, standards specify electrical parameters that which affect how data is exchanged between the video processor and the chip set associated with the CPU. One such standard is associated with the accelerated graphics port (AGP). The Peripheral Components Interconnect (PCI) standard then developed and even more recently, the PCI Express® (PCIe) standard, promulgated by the PCI Special Interest Group (PCI-SIG) of Portland, Oreg. Another standard, currently under development, is the DisplayPort™ Proposed Standard, promulgated by the Video Electronics Standards Association of Milpitas, Calif.

The PCIe standard is discussed herein as an example. Interconnects compliant with the PCIe standard effectively provide a high performance 32-bit or 64-bit bus (e.g., having physical link widths of 1×, 2×, 4×, 8× and/or 16×) with multiplexed address and data lines.

For alternating current (AC) coupling of signals over interconnects from a transmitting integrated circuit to a remote receiver over an interconnect such as one conforming to the PCIe (and DisplayPort™) specifications, blocking unwanted and/or unmatched direct current (DC) levels and matching impedance between them, and attenuating noise, the PCIe standard specifies that AC coupling capacitors be used on the transmitting end.

Conventional PCIe designs use off-chip discrete capacitors for the AC coupling function. This is required for all transmitting data lines. For bidirectional communication, two transmitting lines are needed for each bus data line, e.g., one for each of the communicating devices. Assuming a 32-bit bus width (e.g., with 16 lanes transmitting and 16 lanes receiving, effectively simultaneously), the conventional design requires 64 off-chip discrete capacitors for AC coupling. The number of discrete components unfortunately consumes space on the PCB that could be used for other functionality and/or reduce the size of the PCB.

SUMMARY OF THE INVENTION

Embodiments of the present technology are directed toward techniques for capacitively coupling signals with integrated circuits. The present technology may best be understood by referring to the following description and accompanying drawings that are used to illustrate embodiment of the present technology.

Accordingly, a need exists for efficiently capacitively coupling an alternating current (AC) signal between a transmitting integrated circuit (IC) and a remote receiver.

Systems, circuits, devices and apparatus for capacitively coupling signals with an IC are described. Capacitive elements integrated within a transmitting IC effectively function as AC coupling capacitors for a PCIe or other interconnect linking the transmitting IC with a receiver disposed remote there from. By integrating the capacitive elements, the off-chip discrete components can be eliminated.

In one embodiment, a system for signaling a remote receiving electronic device, comprises a transmitting component disposed within an integrated circuit, for generating a signal and a capacitive component such as an integrated coupling capacitor integrated within the IC and coupled to the transmitting component couples the signal to the remote receiving electronic device via an interconnecting functionality, such as a Peripheral Component Interconnect Express (PCIe) interconnect and/or an interconnect compliant with the DisplayPort™ standard.

In one embodiment, the interconnect includes multiple transmissive lanes and the capacitive component multiple capacitive elements. In one embodiment, each of the transmissive lanes includes a pair of differential conductors, each coupled through one of the capacitive elements to opposite bipolar terminals of the transmitting component. In one embodiment, the capacitive elements outnumber said terminals and can be configured to effectively replace defective capacitive elements.

Other embodiments include a circuit, an integrated circuit device and a printed circuit board apparatus. Embodiments also include a novel receiver detection protocol, on the transmitter end, that utilize integrated AC coupling capacitors.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description are not drawn to scale. Embodiments of the present technology are illustrated by way of example and not by way of limitation, in the figures of the accompanying drawings and in which like reference numerals refer to similar elements and in which.

DETAILED DESCRIPTION OF THE INVENTION

Embodiments of the present invention related to electronic networking More specifically, embodiments of the present invention relate to systems, circuits, devices and apparatus for capacitively coupling signals with an integrated circuit.

Exemplary embodiments of systems, circuits, devices and apparatus for capacitively coupling signals with an integrated circuit are described below. Reference will now be made in detail to embodiments of the present invention, examples of which are illustrated in the accompanying drawings. While the present invention will be described in conjunction with the following embodiments, it is to be understood that they are not intended to limit the present invention to these embodiments alone. On the contrary, the present invention is intended to cover alternatives, modifications, and equivalents which may be included within the spirit and scope of the present invention as defined by the appended claims.

Furthermore, in the following detailed description of the present invention, numerous specific details are set forth in order to provide a thorough understanding of the present invention. However, embodiments of the present invention may be practiced without these specific details. In other instances, well-known methods, systems, apparatus, procedures, components, and circuits have not been described in detail so as not to unnecessarily obscure aspects of the present invention.

The description below discusses the PCIe standard as descriptive of an exemplary peripheral component interconnect. The reference to the PCIe standard and other standards is made to be descriptive by way of example and is not meant or to be construed as to be limiting. Embodiments of the present invention are well suited to be practiced with other interconnect standards as well, including the DisplayPort™ standard.

Embodiments of the present invention relate to a system circuit for capacitively coupling signals with an integrated circuit. Systems, circuits, devices and apparatus for capacitively coupling signals with an IC are described. Capacitive elements integrated within a transmitting IC effectively function as AC coupling capacitors for a PCIe, DisplayPort™ or other interconnect linking the transmitting IC with a receiver disposed remote there from.

Therefore, the limitations of using discrete AC coupling capacitors mounted externally on a printed circuit board (PCB), e.g., which can relate to size, form factor, routing of traces and vias, functionality limitations, signal integrity, noise attenuation, impedance control, defect potential and expense, among others, can be avoided.

Exemplary Fabric Topology

Figure 1:
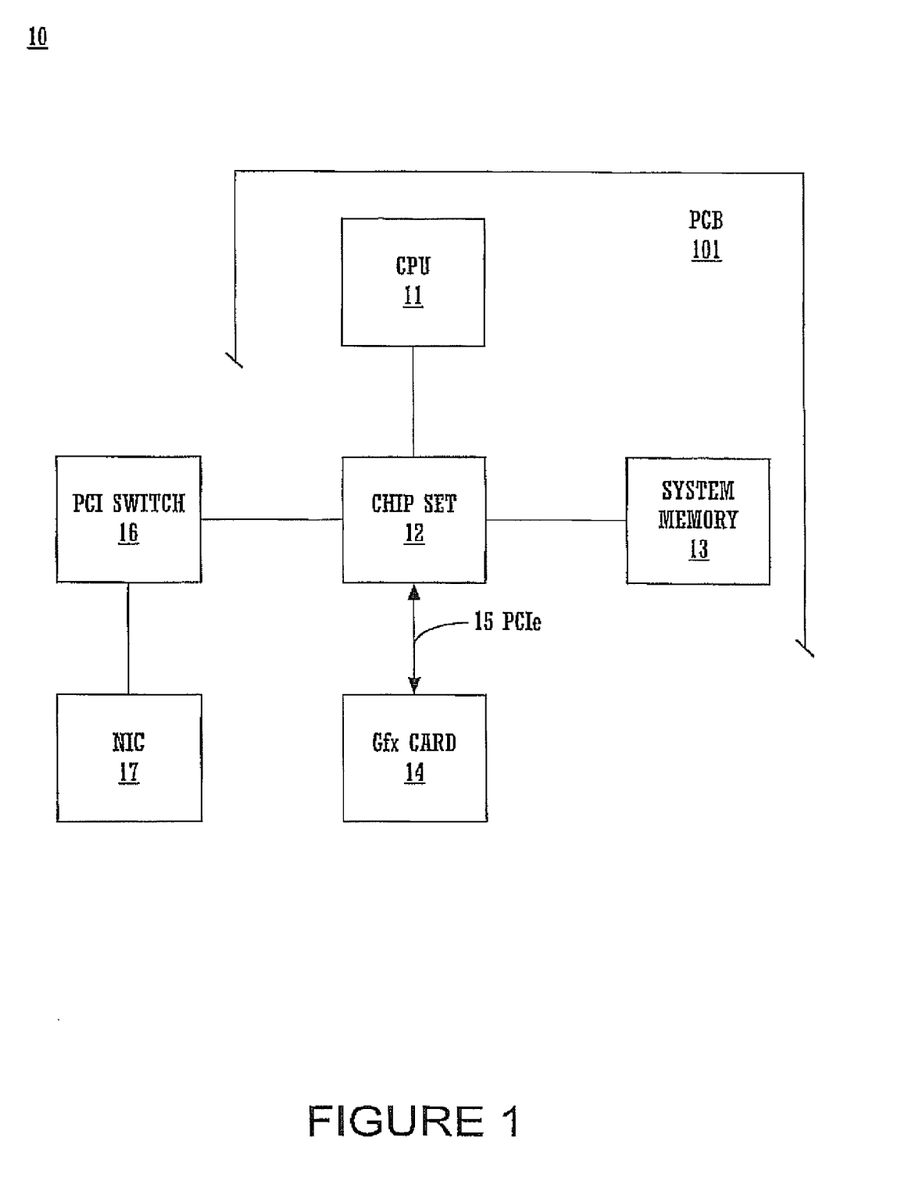
FIG. 1 depicts an exemplary signal routing fabric topology, upon which an embodiment of the present invention may be deployed.

FIG. 1 depicts an exemplary signal routing fabric topology 10, upon which an embodiment of the present invention may be deployed. A central processing unit (CPU) 11 is coupled to system memory 13 and to various input/output (I/O) sources through a chip set 12. Chip set 12 includes one or more integrated circuits (ICs) and functions as a root complex of an I/O hierarchy for CPU 11.

The I/O sources include a graphics card 14 and a network interface card (NIC) 17, which is coupled through a peripheral component interconnect (PCI) switch 16. CPU 11 and system memory 13 are mounted on a motherboard 101. Motherboard 101, NIC 17 and graphics card 14 each comprise a separate (e.g., distinct, remote from the others) printed circuit board (PCB).

Signals are exchanged between the various I/O sources and the chipset via a peripheral component interconnect (PCI) 15. In one embodiment, interconnect 15 substantially conforms to a Peripheral Component Interconnect Express (PCIe) standard such as the PCI Express Base Specification (file://www.pcisig.com). Which is incorporated herein by reference for background information. In one embodiment, interconnect 15 substantially conforms to the DisplayPort™ Proposed Standard (available at http://vesa.org/Standards/), which is incorporated herein by reference for background information.

Interconnect 15 can comprise conductors, traces on the PCBs of graphics card 14 and the PCB upon which chipset 14 is mounted, connectors and AC coupling capacitors (e.g., coupling capacitors C26; FIG. 2B).

Signals exchanged via interconnect 15 are transmitted from one component such as the peripheral components and received by another component such as chip set 12 and vice versa. For instance, graphics card 14 transmits graphics related data signals to chipset 12 via interconnect 15. Interconnect 15 thus functions to allow a communication link (e.g., channel) between graphics card 14, the transmitter, and chipset 12, the receiver, such as described below.

Exemplary Link

Figure 2A:
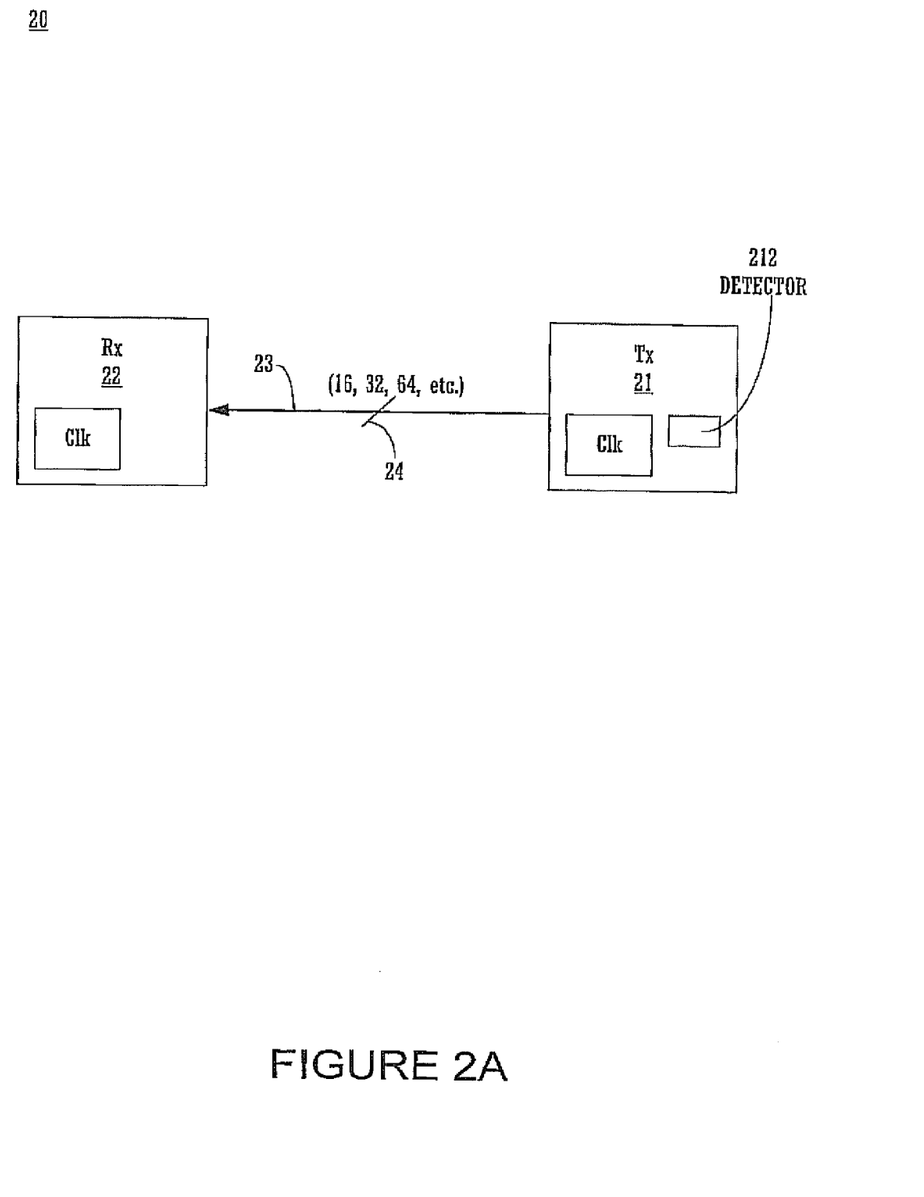
FIG. 2A depicts an exemplary communication channel, according to an embodiment of the present invention.
Figure 2B:
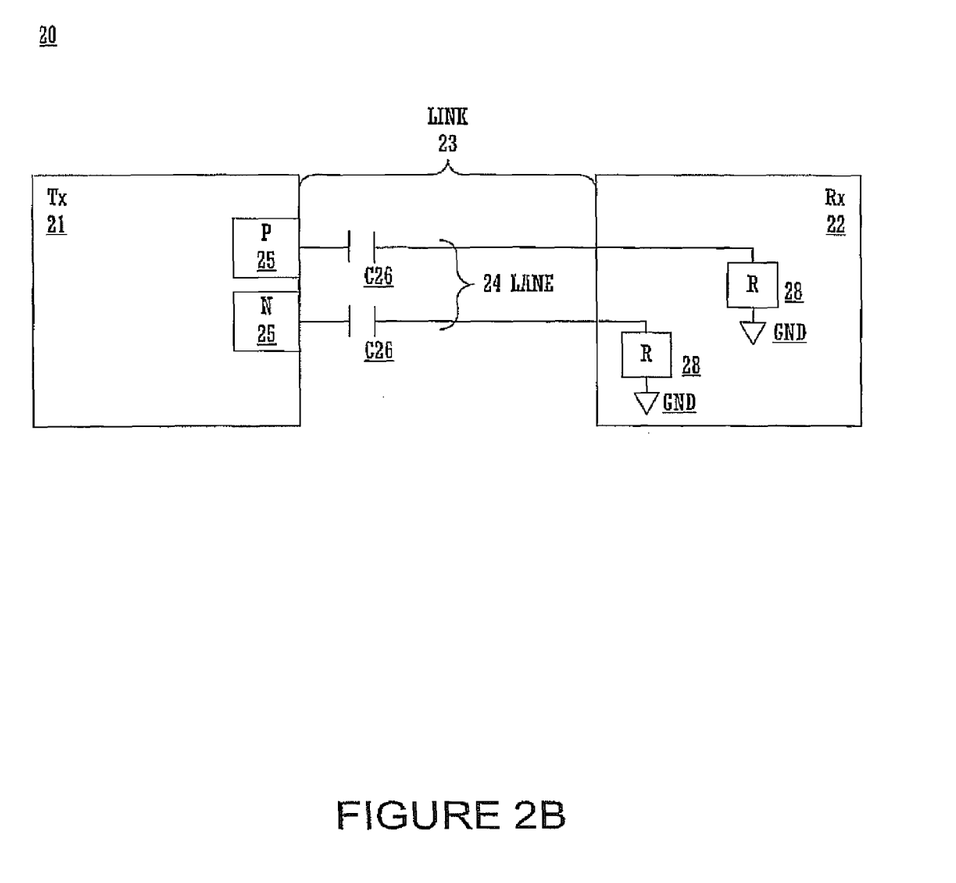
FIG. 2B depicts an exemplary communication channel (in somewhat greater detail), according to an embodiment of the present invention.

FIG. 2A depicts an exemplary communication channel 20, used with an embodiment of the present invention. In one embodiment, communication channel 20 comprises a dualsimplex communication link 23 for exchanging a signal between two components, a transmitter 21 and a receiver 22. Transmitter 21 and receiver 22 operate with an embedded data clock Clk to achieve high data rates. Transmitter 21 includes a detector 212 for detecting the presence of receiver 22 at the opposite end of link 23.

Referring again to FIG. 1, interconnect 15 supports a link 23 between graphics card 14 and chipset 12. Link 23 supports signal exchange between these components with graphics card 14 transmitting and chipset 12 receiving the signals and vice versa. Link 23 comprises at least two signal pairs, a transmit pair and a receive pair. Each pair comprises a lane 24. Link 23 thus supports at least one lane 24. To scale bandwidth, link 23 can aggregate multiple lanes 24. In the implantation depicted, link 23 aggregates 32 lanes exemplified with lane 24. In one embodiment, the transmit and receive pairs comprise low voltage, differentially driven signal pairs.

FIG. 2B depicts communication channel 20 in more detail to illustrate one of the signal pairs of lane 24. Lane 24 comprises a set of the differential signal pairs shown. Referring again to FIG. 1, interconnect 15 extends from the pins of graphics card 14 and those of chipset 12. Lane 24 extends signals from the pins 25 of transmitter 21 to termination at receiver 22 through resistances R28 to ground.

Coupling capacitors C26 function to couple alternating current (AC) signals from transmitter 21 into lane 24, attenuate noise and block direct current (DC). Because AC coupling capacitors C26 effectively block DC, transmitter 21 and receiver 22 can operate at different voltages. Graphics card 14 and chipset 12 can thus each operate with a different DC voltage.

Typical Conventional PCB

Figure 3:
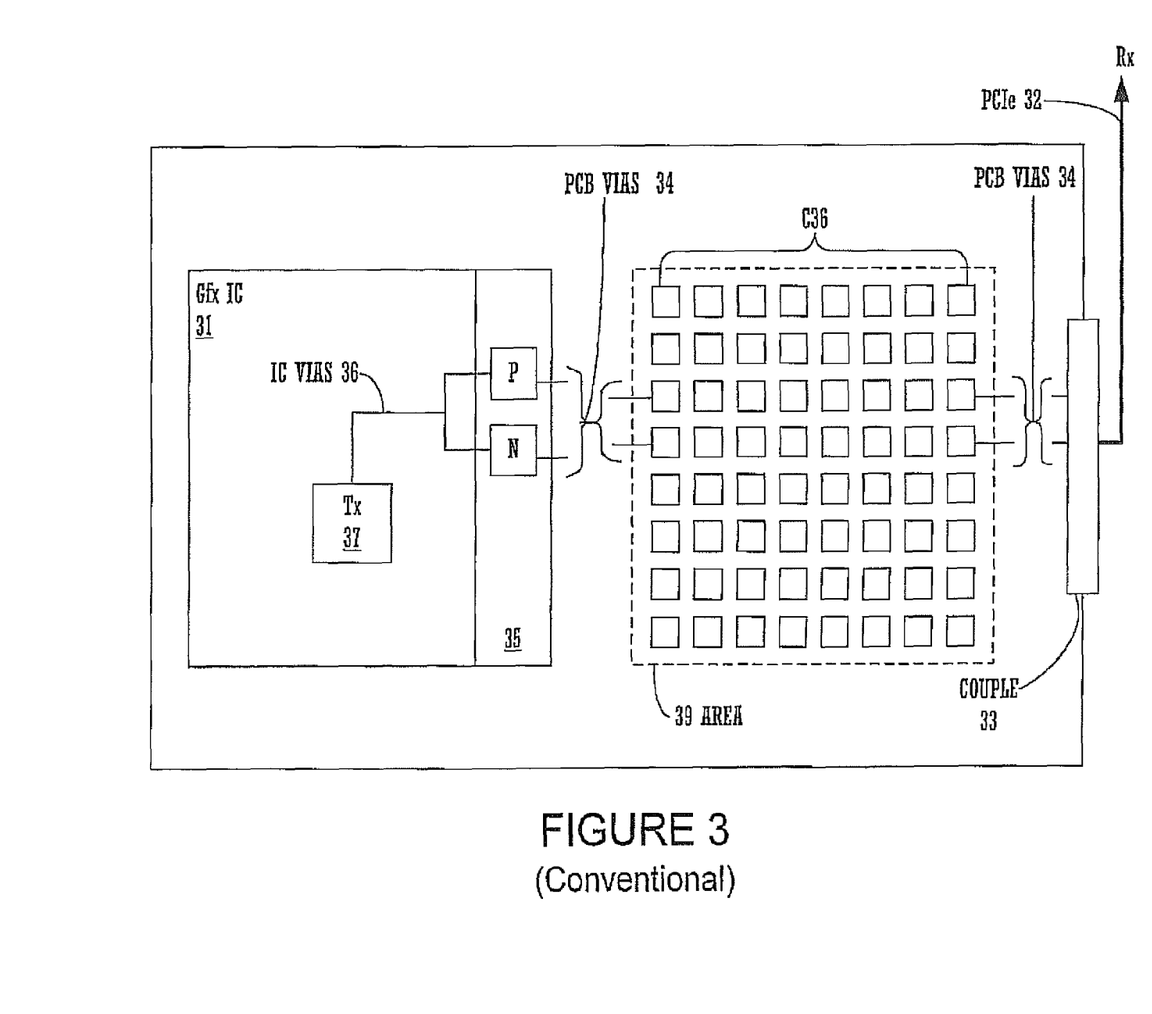
FIG. 3 depicts a printed circuit board apparatus, with which an embodiment of the present invention may be contrasted.

FIG. 3 depicts a typical conventional PCB apparatus 30. PCB 30 is exemplified herein as a typical graphics card. As such, a graphics processor 31 is mounted thereon. Signals from a transmitting functionality (Tx) 36 of graphics processor 31 are transmitted via a PCIe link 32 to a remote receiver (e.g., chipset 12; FIG. 1).

These signals are coupled from Tx 36 on vias of IC 31 to its pins 35, where they are coupled to traces of PCB 30 by terminals 35P and 35N. The signals are conducted on (e.g., through, etc.) PCB 30 from the graphics processor 32 over traces (e.g., vias, etc.) 34. The signals are coupled through AC coupling capacitors C36. As each link comprises two lanes, where link 32 supports 32 lanes, 64 coupling capacitors C36 are required. The signals are coupled to a coupler (e.g., connector, etc.) 33 and off PCB 30 by PCIe link 32.

For a variety of electrical and economic considerations, capacitors C36 in conventional PCBs such as PCB 30 typically have discrete capacitances in or around the range of 75-100 nanofarads (nF). Capacitors in this capacitance range can tend to be significantly large in relation to other modern electronic devices mounted on PCB 30.

A significant area 39 of PCB 30 can thus be consumed where discrete coupling capacitors 36 are arrayed, where they are affixed thereto (e.g., electrically and mechanically). The area 39 of PCB 30 that is consumed by coupling capacitors C36 is thus unavailable for mounting other, e.g., active components. PCB 30 must be large enough to accommodate area 39 as well as the board's other functionalities. Further, its form factor can be affected by the size and shape of the coupling capacitors C36, which may comprise protruding discrete components.

Thus, PCB 30 may be constrained to use in circumstances (e.g., applications, situations, etc.) in which its size, form factor, etc. will not comprise significant limitations. Where its size has an upper limitation, the functionality of PCB 30 may be constrained, such as where needed components to support added functionality are unavailable. For instance, functional components may effectively be displaced as space to mount them on PCB 30 is consumed by the 64 coupling capacitors C36 there mounted.

With conventional PCB 30, where any of coupling capacitors become defective, they must be physically replaced, which can consume time, labor and expense. Moreover, the routing of traces 34 in at least area 39 and around terminals 35P and 35N is significantly tasked and perhaps complicated with the need to connect coupling capacitors C36. This can pose significant design issues and related expense. Possibly related effects can include noise, signal integrity, defect potential and impedance control, which can have their own associated costs. Resulting demands on trace and via routing can further constrain the functionality of PCB 30.

Exemplary IC Device

Figure 4A:
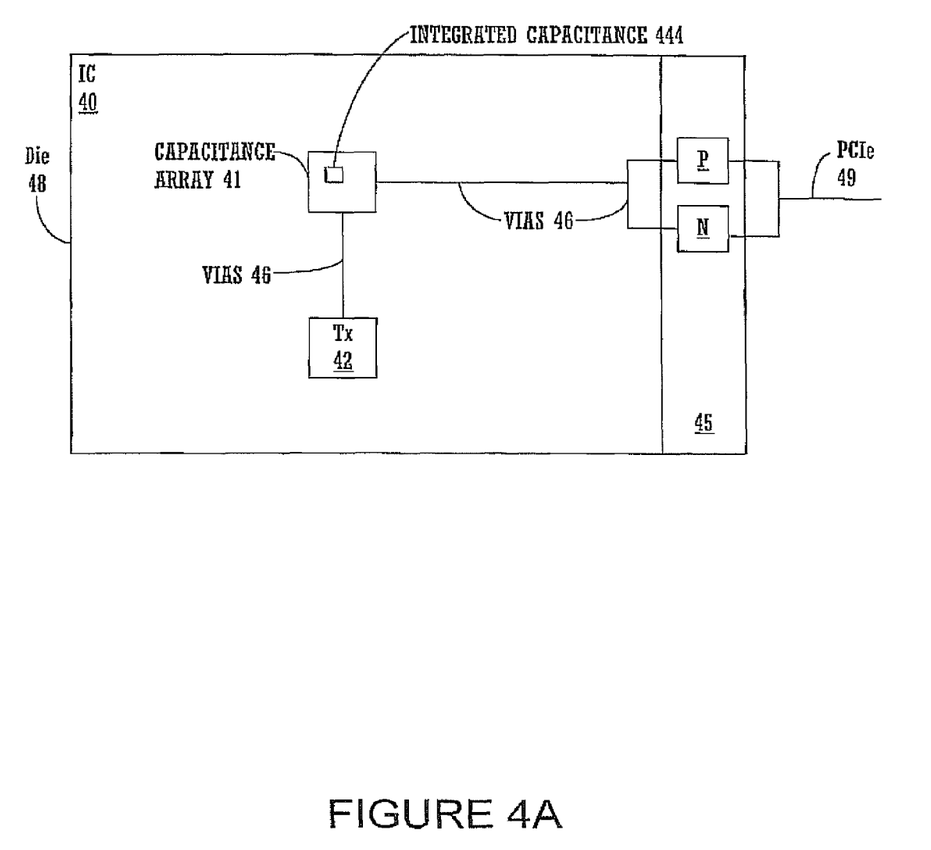
FIG. 4A depicts an exemplary integrated circuit device, according to an embodiment of the present invention.

FIG. 4A depicts an exemplary IC device 40, according to an embodiment of the present invention. IC device 40 is exemplified by a graphics processor, but can be any IC device that has a signal transmission function. A transmitting functionality (e.g., transmitter, etc.) 42 disposed within the die 48 of graphics processor 40 generates signals.

The signals are conducted on vias 46 disposed within graphics processor 40 and coupled to a PCIe link 49 (or e.g., a link 49 that is substantially compliant with the DisplayPort™ or another standard) terminated on terminals 45P and 45N, which are among the pins 45 of graphics processor 40. Importantly, the signals are coupled with AC coupling capacitive elements (e.g., capacitances, capacitors, capacitive devices, functionalities, etc.) 444, which are integrated within die 48 in a capacitance array 41.

The coupling capacitors 444 comprise capacitive elements such as interleaved metal and/or conductive substrate layers, interleaved fingers and/or other structures disposed in an electrically and/or routing functional array 41 within die 48 such as with methods known in the art.

Advantageously, integrated coupling capacitors 444 effectively achieve their AC coupling function with low capacitances, which in one embodiment are in or around the range of one to ten nanofarads (1-10 nF). Considerable benefits related to size, form factor and expense are realized with embodiments of the present invention, wherein the relatively low capacitance coupling capacitive elements 444 are integrated within IC 40.

Figure 4B:
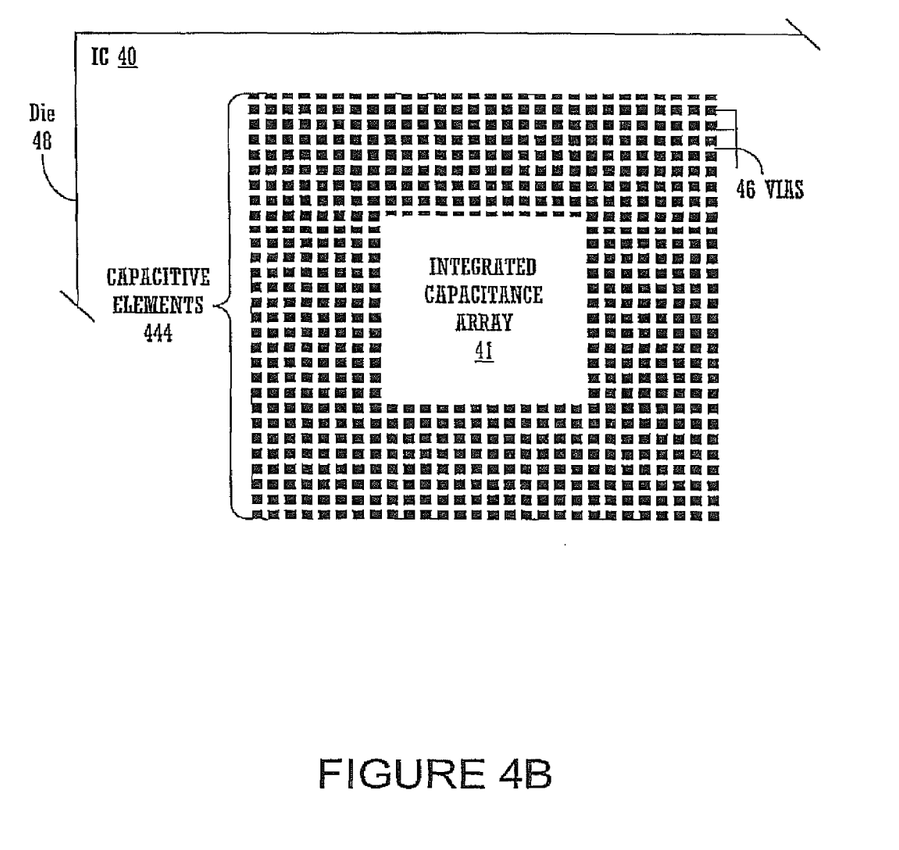
FIG. 4B depicts an exemplary integrated circuit device (in somewhat greater detail), according to an embodiment of the present invention.

FIG. 4B depicts IC device 40 in somewhat greater detail to describe the integrated array 41 of capacitances 444, according to one embodiment of the present invention. Vias 46 disposed within die 48 electrically couple each of capacitive elements 444 to appropriate bus lane pads. In one embodiment, more capacitive elements 444 are included in capacitive array 41 than are required for the number of lanes supported. Advantageously, where one or more of integrated capacitive elements 444 are defective, programming or reconfiguring IC 40 allows the substitution of as yet unused others of integrated capacitive elements 444. This has the benefit of obviating the expense & tedium of manual replacement of discrete capacitors, characteristic of the conventional art.

Exemplary PCB Apparatus

Figure 5A:
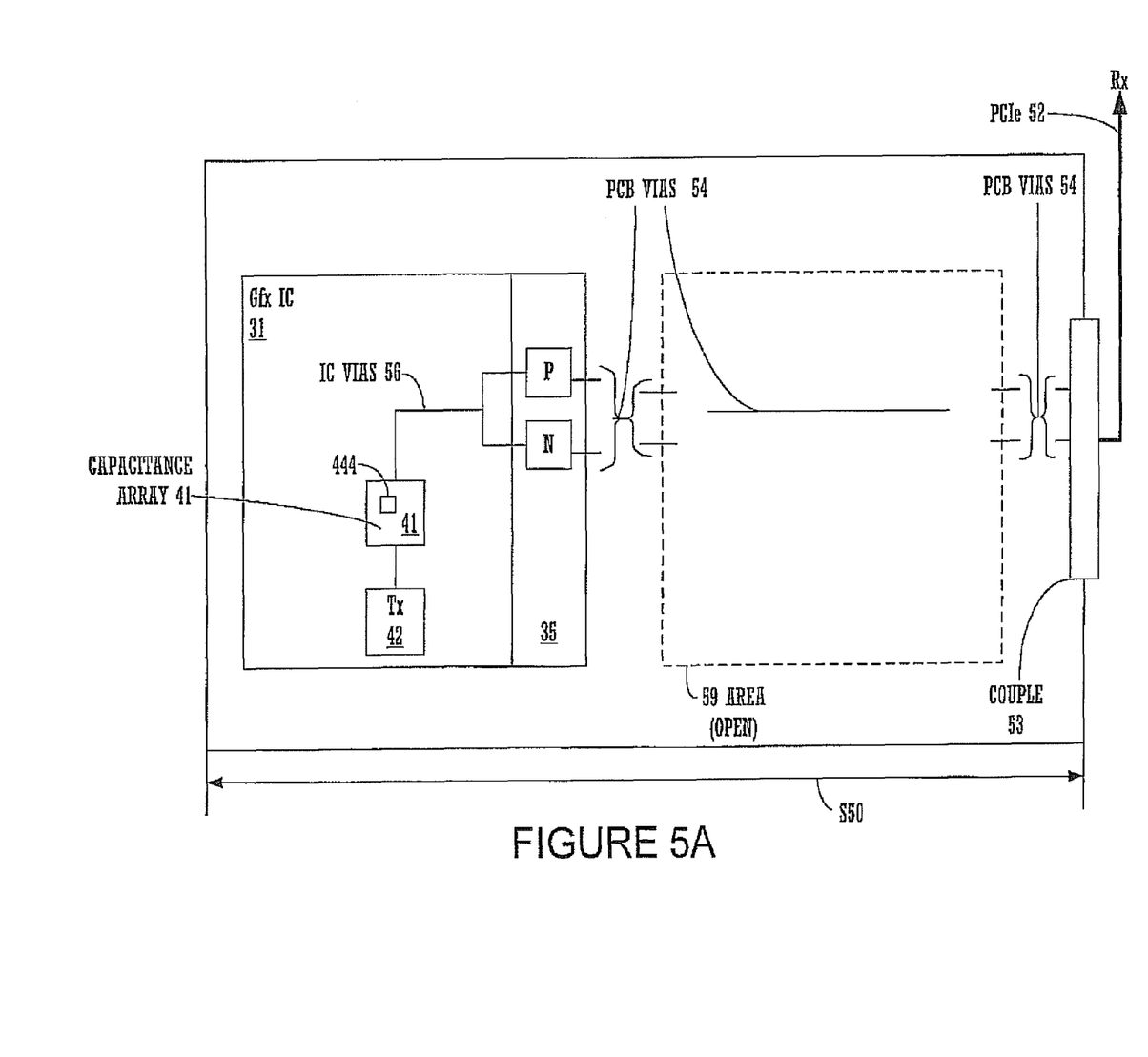
FIG. 5A depicts an exemplary printed circuit board apparatus, according to an embodiment of the present invention.

FIG. 5A depicts an exemplary PCB apparatus 50, according to an embodiment of the present invention. An IC having a transmitting function and integrated AC coupling capacitances, such as is exemplified herein by graphics processor 41, is disposed upon a PCB 51. Signals transmitted by Tx 42 within IC 41 are coupled to a PCIe interconnect 52 with vias (e.g., traces, etc.) 56 and coupler 53 for transmission to a remote receiver (e.g., Rx 22; FIG. 2A). PCB 50 has a certain size, reflected in the length S50 of one of its edges.

In as much as the AC coupling capacitances 444 are disposed in an array 41, the area 59 on PCB 51 is significantly open, in comparison for instance with conventional PCB 30

(FIG. 3), which would otherwise be consumed by mounting discrete coupling capacitors C36. Further, the vias 56 that pass through area 59 do not have to be routed with significant consideration paid to connecting such discrete coupling capacitors. Advantageously, area 59 and vias 56 routed therein are free for use in support of other functions. This has the benefit of potentially added functionality for PCB 50, in comparison to conventional PCBs such as PCB 30.

Figure 5B:
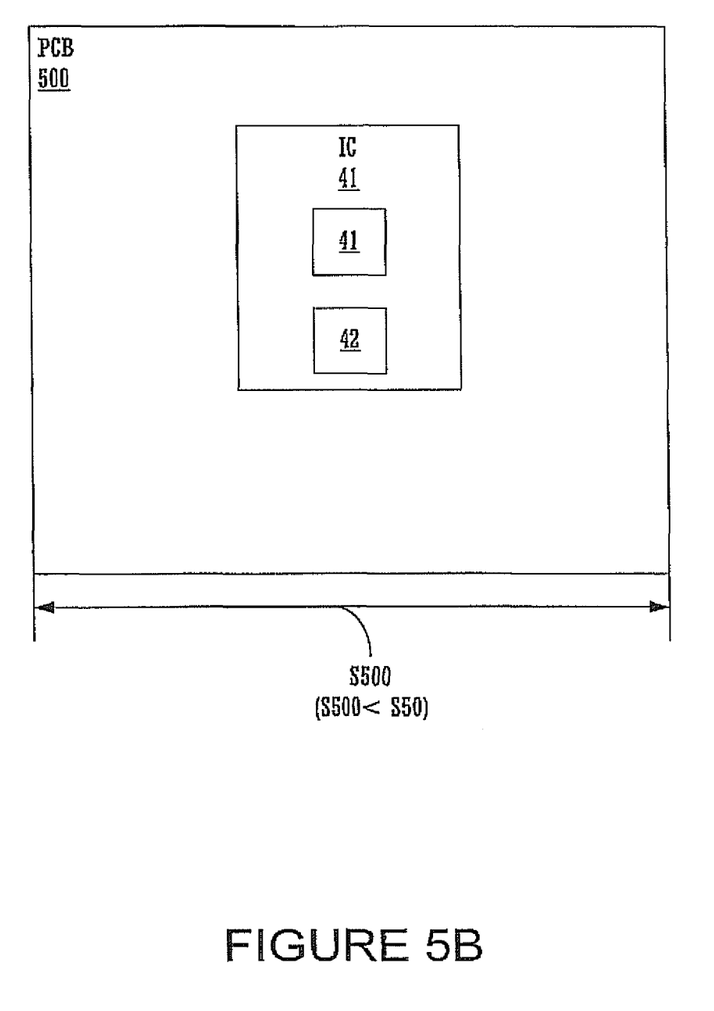
FIG. 5B depicts another exemplary printed circuit board apparatus, according to an embodiment of the present invention.

In another embodiment, the PCB area effectively saved by integrating coupling capacitances within IC device 41 can be leveraged to achieve the benefit of a smaller sized PCB. FIG. 5B depicts another exemplary PCB apparatus 500, according to such an embodiment. PCB 500 has a certain size, reflected in the length 5500 of one of its edges, which is less than the length S50 of PCB 50 (FIG. 5A). Thus, PCB 500 is smaller than PCB 50 and can be used in circumstances wherein PCB 50 would be too large. Where their functionalities are comparable, the effectively miniaturized PCB 500 can advantageously provide that functionality in a smaller package.

Exemplary Receiver Detection Circuit and Processes

With reference again to FIG. 2A, for transmitting entities such as transmitter 21 to function with PCIe, DisplayPort™ compliant and other interconnects, they must detect that receiver 22 is present at the opposite end of link 23. Electrically based receiver detection circuits and methods can are used in one embodiment.

Figure 6A:
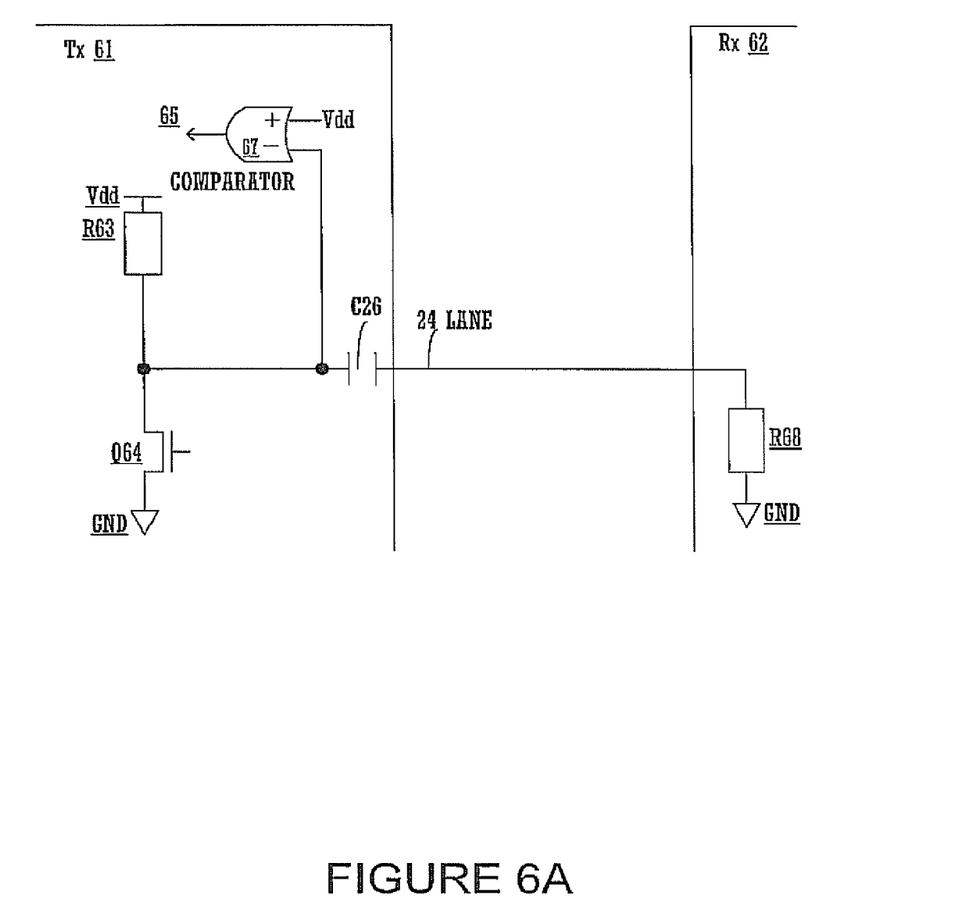
FIG. 6A depicts an exemplary detection circuit, according to an embodiment of the present invention.

FIG. 6A depicts an exemplary receiver detection circuit 60, according to an embodiment of the present invention. Lane 24 terminates in Tx 61 between resistance R63 and transistor Q64. Signals generated by Tx 61 are coupled through integrated AC coupling capacitance 66 through lane 24 to Rx 62, where they dissipate to ground Gnd through resistance R68. Comparator 67 compares voltage sensed on the Tx 61 side of coupling capacitance 66 to supply voltage Vdd and generates a corresponding comparison signal 65 with Rx 62 functionally present.

Figure 6B:
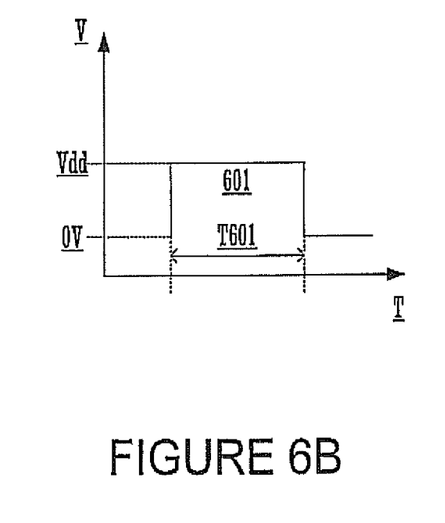
FIG. 6B depicts an exemplary test pulse, according to an embodiment of the present invention.

FIG. 6B depicts an exemplary transmitter generated test pulse 601 coupled onto lane 24, according to an embodiment of the present invention. An amplitude based detection is made in one embodiment. In one embodiment, a resistive/capacitive (RC) based time constant (TC) associated with the return traces is detected. These are described below.

Figure 6C:
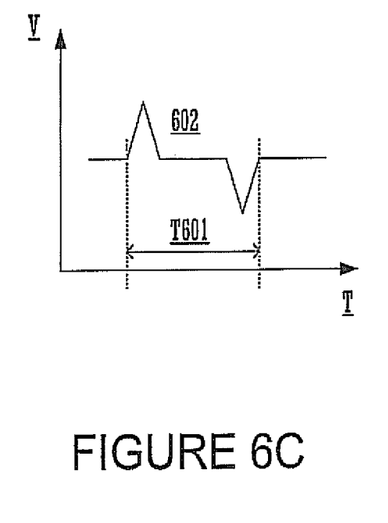
FIG. 6C depicts an exemplary amplitude based detection return, according to an embodiment of the present invention.

FIG. 6C depicts an exemplary amplitude based detection return signal 602, according to an embodiment of the present invention. With Rx 62 functionally present on the lane, the rising and falling edges of test pulse 601 each generate return pulses of opposite polarity. Where Rx 62 was not present, a single pulse at effectively twice the amplitude and opposite in polarity to test pulse 601 could be expected. By discriminating these electrical characteristics, receiver detection is possible.

Figure 6D:
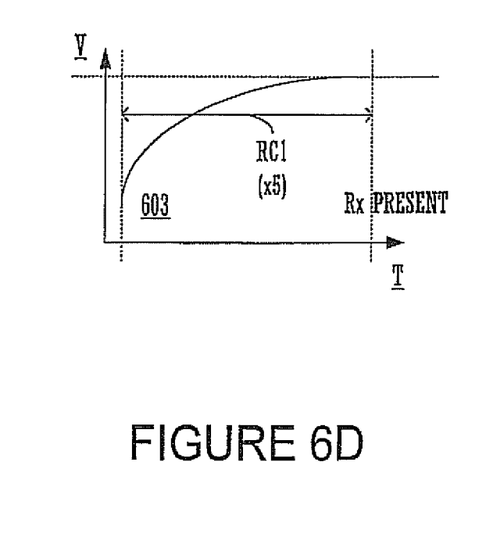
FIG. 6D depicts an exemplary resistive-capacitive time constant based detection return, according to an embodiment of the present invention.
Figure 6E:
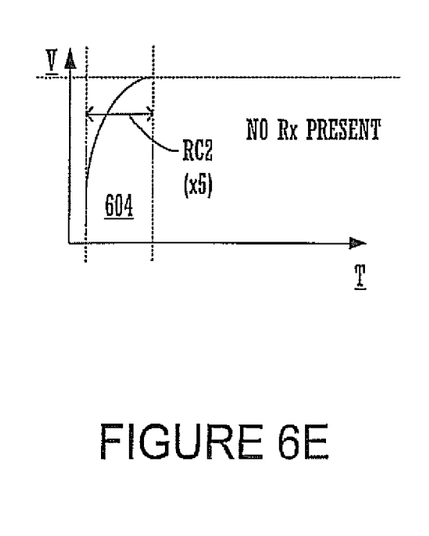
FIG. 6E depicts an exemplary resistive-capacitive time constant based non-detection return, according to an embodiment of the present invention.

FIG. 6D depicts an exemplary resistive-capacitive time constant based detection return signal 603, according to an embodiment of the present invention. With Rx 62 functionally present, the RC TC characterizing the detection return 603 has a period equivalent to time T1. FIG. 6E depicts an exemplary resistive capacitive time constant based non-detection return 604, according to an embodiment of the present invention. With Rx 62 functionally not present (e.g., absent, electrically non-functional, etc.), the RC TC characterizing the return 604 has a period equivalent to time T2, which is significantly shorter than the period of time T1. The shortened period of time T2, in contrast to that of T1, indicates an RC TC indicative of Rx 62 absence. Again, by discriminating these electrical characteristics, receiver detection is possible.

Figure 7:
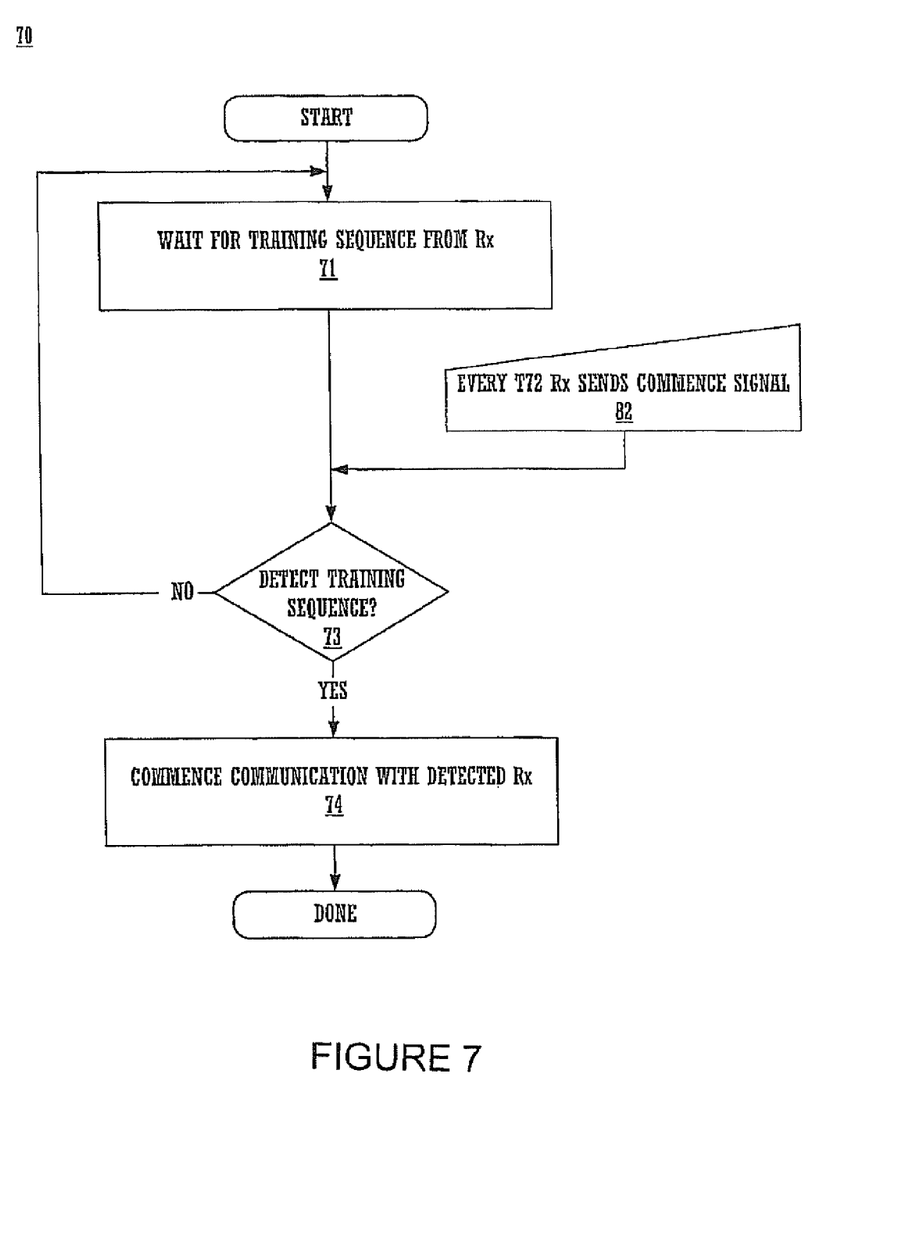
FIG. 7 is a flowchart of an exemplary method for detecting a remote receiver, according to an embodiment of the present invention.

Advantageously, embodiments of the present invention can obviate the electrical detection methods. With integrated coupling capacitances disposed within the dice of the transmitting ICs, state machine based detection processes described in the PCIe specification (and/or e.g., the DisplayPort™ standard, etc.) can be used. FIG. 7 is a flowchart of an exemplary process 70 for detecting a remote receiver, according to an embodiment of the present invention.

Process 70 begins with block 71, wherein a Tx waits for a training sequence message from an associated Rx. In block 72, after every period of time T72 (e.g., 20 milliseconds), an associated functional Rx can be expected to send a commence signal related thereto.

In block 73, it is determined whether a training sequence has been sent by the Rx. If not, process 70 repeats block 71 and awaits a training sequence. Where a training sequence is detected, in block 84, communications can be established between Tx and Rx, wherein Tx transmits signals to Rx, which ends process 70.

In summary, systems, circuits, devices and apparatus for capacitively coupling signals with an integrated circuit are disclosed. Capacitive elements disposed within a transmitting IC effectively function as AC coupling capacitors for a PCIe type or other interconnect (e.g., substantially compliant with the DisplayPort™ standard) linking the transmitting IC with a receiver disposed remote there from.

Thus, a system and circuit for capacitively coupling signals with an integrated circuit are described. While the present invention has been described with reference to particular exemplary embodiments, the present invention should not be construed as limited by such embodiments, but rather construed according to the claims below.

What is claimed is:

1. An integrated circuit comprising:
   a plurality of means for transmitting signals over a plurality of transmission lanes; and
   a plurality of means for capacitively coupling said signals to said plurality of transmission lanes wherein said plurality of capacitively coupling means are integrated in an integrated circuit with said plurality of means for transmitting signals and are configurable to replace a defective capacitive coupling means to any one or more of said plurality of transmission lanes.

2. The integrated circuit of claim 1, wherein said plurality of transmission lanes comprises a peripheral component interconnect (PCI).

3. An integrated circuit comprising:
   a plurality of means, integrated on a integrated circuit die, for transceiving a plurality of signals;
   a plurality of capacitive coupling means, integrated on said integrated circuit die, wherein said plurality of capacitive coupling means is greater than said plurality of signals; and
   a plurality of means, integrated on said integrated circuit die, for interconnecting each of said plurality of signals to a capacitive coupling means, wherein said interconnecting means is configurable to replace a defective capacitive coupling means to any one or more of said plurality of signals with another one of said plurality of capacitive coupling means.

4. The integrated circuit of claim 3, wherein said configurable interconnecting means comprises a means for programmably substituting an unused one of said capacitive coupling means for said defective capacitive coupling means.

5. The integrated circuit of claim 3, wherein each of said capacitively coupling means interconnected to one of said plurality of signals couples said one of said plurality of signals to peripheral component interconnect (PCI) transmission means.

* * * * *